United States Patent [19]

Walton

[11] Patent Number: 4,934,094
[45] Date of Patent: Jun. 19, 1990

[54] METHOD OF GROWING SOD AND SOD PRODUCT THEREBY FORMED

[76] Inventor: Wayman E. Walton, 7355 Agate St., Rancho Cucamonga, Calif. 91730

[21] Appl. No.: 254,038

[22] Filed: Oct. 6, 1988

[51] Int. Cl.$^5$ .............................................. A01G 1/00
[52] U.S. Cl. ............................................. 47/56; 47/9; 47/58
[58] Field of Search ...................................... 47/9, 56

[56] References Cited

U.S. PATENT DOCUMENTS

| | | | |
|---|---|---|---|
| 2,605,589 | 8/1952 | Kuestner | 47/56 |
| 3,845,584 | 11/1974 | Mercer | 47/56 |
| 3,863,388 | 2/1975 | Loads | 47/56 |
| 3,890,739 | 6/1975 | Blackburn | 47/56 |
| 4,091,586 | 5/1978 | Zinter | 47/56 |
| 4,716,679 | 1/1988 | Heard | 47/56 |
| 4,720,935 | 1/1988 | Rogers et al. | 47/56 |

Primary Examiner—Robert A. Hafer
Assistant Examiner—Lynda M. Cofsky
Attorney, Agent, or Firm—Boniard I. Brown

[57] ABSTRACT

A method of growing sod and sod product produced thereby wherein mushroom mulch is used as a growing medium. A seed bed is formed by sowing seeds on the upper surface of a mulch layer. A porous net is placed over the mulch layer to form an anchorage system for the sod root system. Also, a second mulch layer is laid over the sown seeds to protect the seeds and prevent any undesired drying out of the mulch material in closest proximity to the seeds.

16 Claims, 2 Drawing Sheets

METHOD OF GROWING SOD AND SOD PRODUCT THEREBY FORMED

BACKGROUND AND SUMMARY OF THE INVENTION

This invention relates to a method of growing sod that requires substantially less time than conventional methods, e.g., less than fifty percent of the time required under conventional practice. The sod product obtained by the use of my process has several advantages, among which may be mentioned:

1. substantially weed-free product.
2. substantially less unit area weight, for easier handling and increased volume loading on flat bed trailers (weight is no longer the limiting factor).
3. ability to be shipped in much larger strips (or slabs), for quicker laying at the job site and more continuity in the finished sod installation.
4. a relatively strong dense root system.
5. greater sod production at a given facility, due to the shorter growing time.
6. a relatively clean sod product substantially free from loose soil.
7. a relatively strong sod product having intertwined roots that prevent the product from being inadvertently torn apart during shipment or subsequent handling at the point of end use.

An important feature of my invention is the use of compost (wheat straw, horse manure and combined water) as a growing medium; preferred medium is mushroom mulch, i.e., compost material already used for growing mushrooms. As far as I know, no one prior to my invention has used mushroom mulch as a sod-growing medium.

Another feature of my invention is the use of a porous net material at an intermediate level in the growing medium, i.e., between the lower surface and upper surface of the growing medium. The location of the net material advantageously gives the sod product maximum resistance against tearing, stretching, or breaking apart.

Prior to my invention others have proposed sod-growing methods that are in some respects related to my proposed method.

U.S. Pat. No. 4,720,935 to Rogers discloses a sod-growing medium comprised of about 70 percent water-absorptive wood fibers and about 30 percent non-water absorptive cellulose particles. The wood fibers can be papermill by-products; presumable the wood fibers would be sawdust. The cellulose particles can be rice hulls or chopped straw having maximum lengths less than about one-half inch.

U.S. Pat. No. 4,716,679 to Heard discloses a sod-growing medium comprised of comminuted (chopped) straw having lengths in a range between about one-fourth inch and three-fourth inch. The straw is deposited on an inert sub-surface to a depth ranging between three-fourth inch and 1¼ inch. Grass seed is applied to the upper surface of the straw layer in slurry form. Alternately, the grass seed may be pre-mixed with a second quantity of chopped straw and then deposited onto the base straw layer in dry or slurry form. The upper layer (seed and chopped straw) has a preferred thickness ranging up to about one-half inch. Judging from the patent drawings, the straw length in the upper layer is less than one-half the straw length in the base layer.

U.S. Pat. No. 3,863,388 to Loads discloses a sod-growing medium that can be either a mixture of soil and peat, or an exfoliated mineral preparation, or a decomposable cellular resin foam material. The sod-growing medium is deposited onto an inert mesh material having square mesh openings measuring about one-fourth inch on a side. The sod-growing medium is laid to a depth of about three-eighth inch. The patentee indicates that the grass roots grow downwardly through the openings in the mesh material, and then laterally underneath the mesh material; the roots bond to the inert mesh material. The patentee does not indicate any particular thickness for the layer of sod-growing material. However, judging from the size of the mesh openings (FIG. 6), the growing medium would have a layer thickness of about one-half inch.

My proposed method differs from the methods disclosed in the above-mentioned patents.

DESCRIPTION OF THE PREFERRED EMBODIMENT

Figure 1:
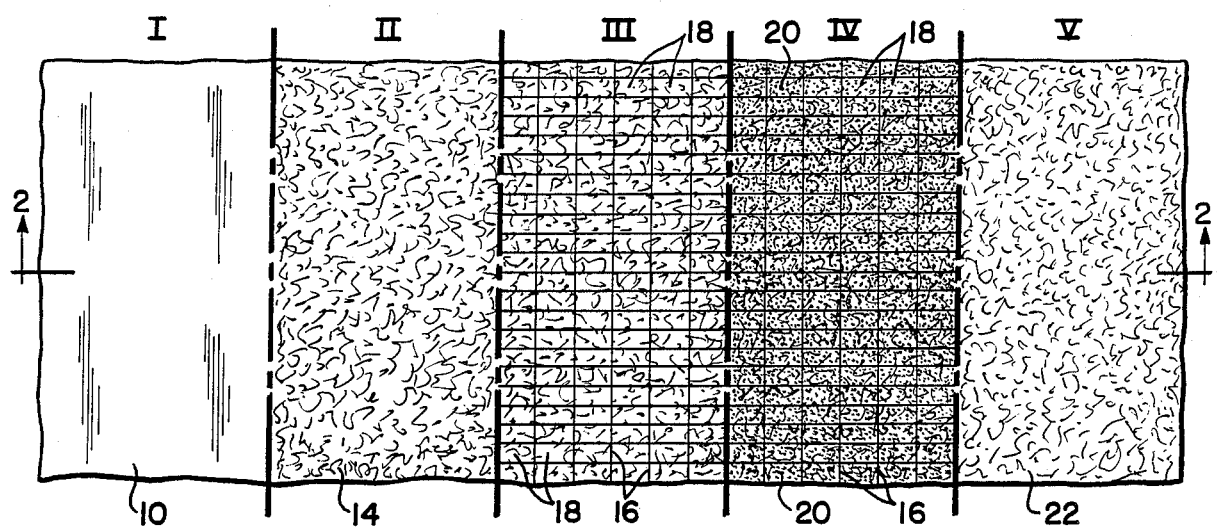
FIG. 1 is a plan view looking down on a sod-growing facility (area) at various different stages during the sod-growing process under my invention.
Figure 2:
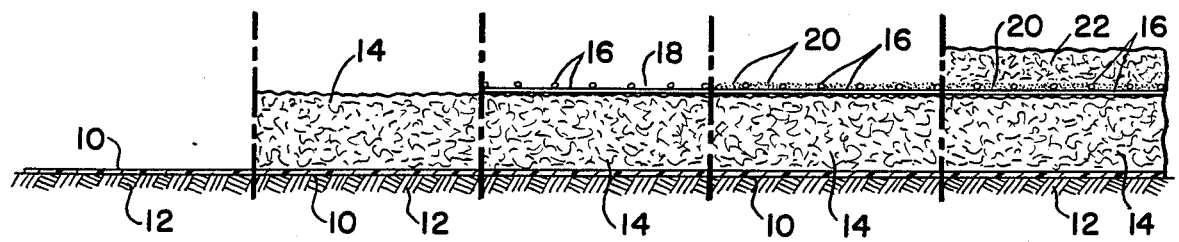
FIG. 2 is a sectional view on line 2—2 in FIG. 1, showing the relative thicknesses of two sod-growing media used in practice of my invention.
Figure 3:
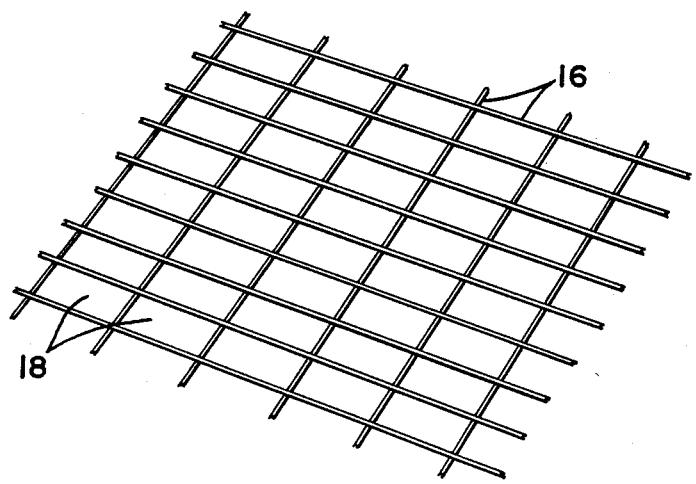
FIG. 3 is a perspective view of a net material used in the FIG. 1 installation.

FIGS. 1 and 2 pictorially illustrate five stages or steps used in practicing my invention. Stage one involves the step of laying down a plastic sheet 10 on ground surface 12. Sheet 10 is an inert, non-porous material that is impervious to grass roots; root growth takes place about sheet 10.

A second step in the practice of my invention is to lay down a layer of sod-growing medium 14 on inert impervious sheet 10. Preferred depth of layer 14 is approximately 2¾ inches; the preferred thickness ranges from about 2½ to 3 inches.

The preferred sod-growing medium is a compost mulch material that has been previously used to grow mushrooms. The mulch material is purchased from mushroom growers as a product no longer usable for mushroom-growing purposes.

People in the mushroom-growing industry have found that a new supply of mulch (growing medium) is required for each crop of mushrooms. After the mulch has been used to produce one crop of mushrooms it is no longer chemically (bacterially) suitable for growing a second crop. However I have found that the used mulch can be used for growing sod. The mulch is available from mushroom growers at relatively low cost.

Mushroom mulch is a porous water-impregnated material that may be formed by combining (mixing) wheat straw and horse manure. The relative proportions of the straw and manure have varied over the years, and from one mushroom grower to another. However, a representative mulch might have about equal percentages of straw and manure on a weight basis. Since the manure has a significantly higher density than the straw, the straw is predominate in a volume sense. The compost product has the straw-like appearance of bailed hay, except that it usually is somewhat darker brown in coloration.

During preparation of the mushroom mulch the straw is first wetted thoroughly with water, e.g., by immersion in a water bath or dripping water droplets onto bales of straw. The water-saturated straw is then chopped into lengths in the range of 6 to 9 inches long. The chopped straw is combined with the manure (and other additives), and formed into blocks or stacks.

The formed blocks can have varying dimensions, one representative set of dimensions being a cube 5 feet on a side. Usually nitrogen (in the form of ammonium sulfate) is added to the mixture to promote the formation of bacteria that will partially decompose the straw. Other additives may be introduced into the mixture, e.g., to counteract greasiness or excessive wetness.

The straw-manure mixture is subjected to a composting process that produces a chemical fermentation of the mixture materials. Initially the block (stack) is left outdoors in a wet condition for an extended period of time (e.g., ten days). At intervals of two or three days the mixture is turned inside out, so to speak, so that material on the inside of the block is repositioned on the outside, and material on the outside is repositioned inside. This enables the fermentation process to be carried forward throughout the mixture.

The partially-fermented mixture is subjected to a second pasteurization step in a high-humidity atmosphere. Heat is applied to the material in a controlled manner, such that the mixture is maintained in a predetermined temperature range, e.g., 125° F.–140° F. for a two-day or three-day period.

The pasteurization is designed to kill any bacterial mechanisms that might later compete with the mushroom spores, to soften the straw fibers, and to enhance the microbial protein-producing action of the nitrogen.

The mulch resulting from the pasteurizing step is a friable straw-like product that is relatively dry to the touch and dark brown in color. However, in fact the mulch has significant quantities of water within its fibers. More than one-half of the product weight is water in combined form, i.e., within the product fibers.

In the process of growing mushrooms a relatively small quantity of soil or soil-peat mixture is applied as a top layer over the mulch surface, to prevent localized drying and to shield the mulch from airborne flies, spores, etc. Therefore, mulch that is subsequently procured from the mushroom grower may have some soil therein.

I have found "used" mushroom mulch to be an excellent sod-growing medium. It has a very high water content; moreover the water is uniformly distributed throughout the mulch as water particles bound up in the compost fibers. The grass roots are enabled to spread out essentially uniformly within the mulch media to seek out the water and growth-producing chemicals. A comparatively dense and extensive root system is developed.

I believe that another advantage of mushroom mulch is the fact that the mulch fibers are in partially decomposed state, due to the fermentation processes that take place during mulch preparation. Cellulose and other growth-producing chemicals (nitrogen and microbial substances) are available in a form where they can be readily assimilated by the roots.

Returning to FIGS. 1 and 2 of the drawings, there is shown therein a porous net material 16 deposited on the upper surface of compost layer 14. Net 16 may be formed of plastic strands arranged in a rectangular pattern, one set of strands extending crosswise of the other set of strands to define rectangular openings 18. The openings in the net material can be approximately 1¼ inch long and ⅝ inch wide, giving an area of about 0.8 square inch for each net opening. A suitable net material may be obtained from Conwed Corporation, located in Minneapolis, Minn.

The net material is located at or near the seed germination zone (where the roots are most dense). Therefore the net has relatively large openings (0.8 square inch) in order not to hamper root growth, and to facilitate intertwining.

Net material 16 forms a porous surface that assists the subsequently-produced product in establishing a strong contiguous base (for the grass roots); the grass roots grow downwardly through the net openings and also randomly in various directions (seeking out the growth-producing chemicals). Roots become intertwined with the net material, such that the net acts as an anchoring base for the sod body.

Grass seed 20 is sown onto the upper face of net 16 and into the openings formed by the net strands. Thereafter a second layer of compost 22 is laid over the grass seeds. Layer 22 has a preferred thickness ranging from 1 to 1½ inches.

I prefer to place net 16 on the compost layer 14 before sowing seeds 20 thereon. However, I believe it would be possible to sow the seeds first, i.e., before placement of net 16 on the compost layer 14. The primary disadvantage of such a procedure would be some disturbance or dislocation of the seeds, and possibly undesired covering of some seeds by the net strand material.

FIGS. 1 and 2 show small sections of the sod-growing installation, at different stages in the bed preparation process. It will be understood that an entire sod farm may comprise many acres of land having the plastic covering 10 and various mulch layer, etc., extending thereacross.

The multi-layer seed bed, comprised of sheet 10, compost layer 14, net 16, dispersed seeds 20 and compost layer 22, may be watered and fertilized in conventional fashion, although watering may be less frequently needed because of the presence of bound-up water in the mulch material.

Figure 4:
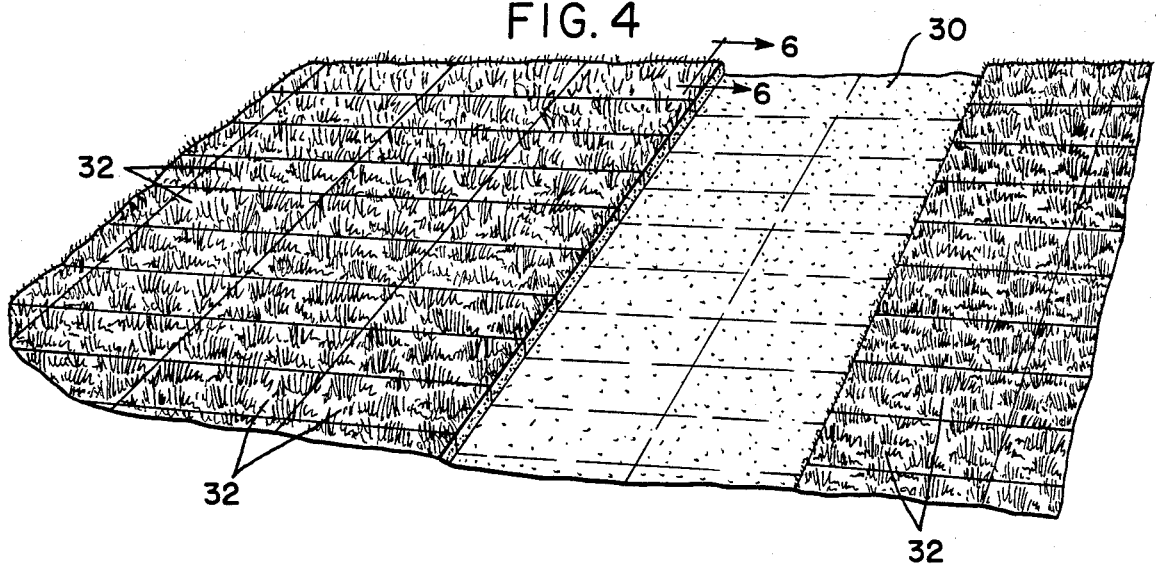
FIGS. 4 and 5 pictorially illustrate mature sod produced by the use of my invention.
Figure 5:
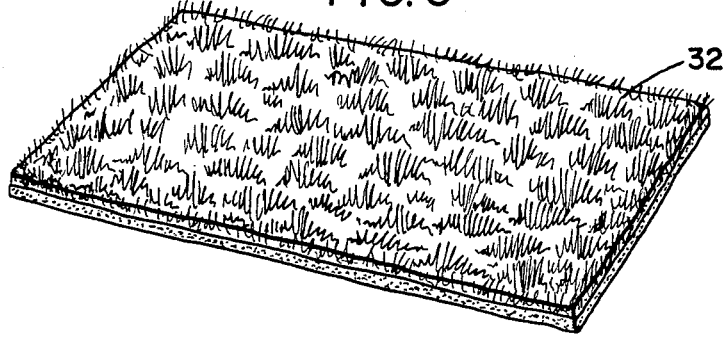

FIG. 4 shows a section of matured sod approximately sixty days after the initial seeding operation depicted in FIGS. 1 and 2. The matured sod can be cut vertically and removed from the sod bed, to leave a bare section for the next planting, as shown for example at 30 in FIG. 4. FIG. 5 shows a sod section 32 removed from the bed.

After the sod-harvesting (cutting) operation the sod slabs (sections) 32 can be physically removed from the ground surface by lifting actions and/or sod roll-up actions. Plastic sheet 10 adheres to the sod root systems and therefore stays with the sod slab when it is lifted from the bed surface. Sheet 10 can be easily peeled from the sod body after its removal from the bed.

Figure 6:
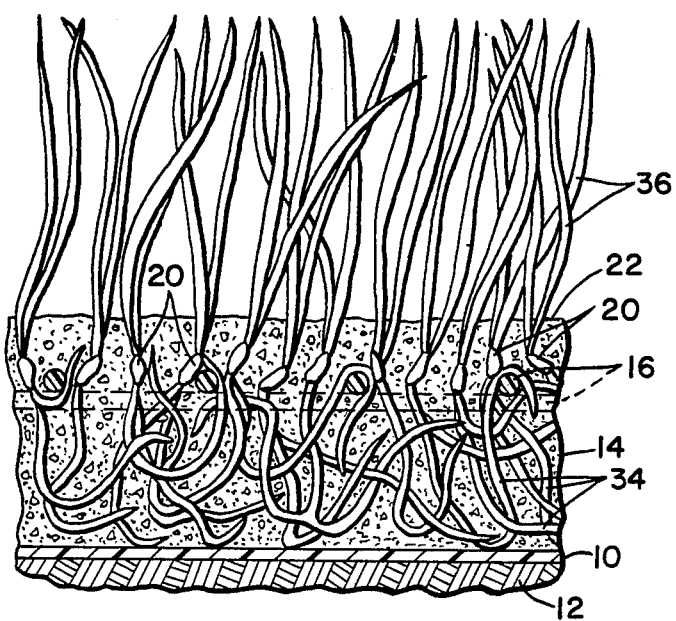
FIG. 6 is an enlarged fragmentary sectional view taken on line 6—6 in FIG. 4.

FIG. 6 is an enlarged sectional view taken through the sod body. It will be seen that the root system 34 is connected to the grass stem areas 36 at, or slightly above, the level of net 16. The lower compost layer 14 is designed to be thicker than the upper compost layer 22, such that layer 14 accommodates a substantial root thickness. The sod product 32 (FIG. 5) has a denser and more developed root system than conventional soil-grown sod. At the same time the sod body has a substantially lower unit area weight than conventional sod; sod grown according to my improved method has a weight that is approximately one-third the weight of soil-grown sod.

Upper compost layer 22 acts as a protective covering for the sown seeds, to prevent drying out of the mulch in closest proximity to the seeds, and to prevent seed loss from such causes as blowing, bird attack, etc. The compost material has a porosity whereby the seeds can germinate effectively.

My improved process is believed to differ substantially from the processes shown in the earlier-mentioned Pat. Nos. 4,720,935 (Rogers), 4,716,679 (Heard) and 3,863,388 (Loads). The prior art sod-growing media comprises wood fibers, cellulose particles and resin foam materials having relatively low water-retention capabilities, compared to the mulch material used in my sod-growing method. Also, the prior art sod-growing media have relatively limited plant food value. In contrast, the partially decomposed fibrous materials used in my method contain substantial quantities of plant nutrients; in my method the retained water within the mulch fibers is believed to liquify the nutrients into a state for ready assimilation by the grass root system. I have been able to grow an acceptable sod product within a period of sixty days (dating from initial formation of the seed bed).

As noted previously, my method contemplates the placement of a porous net 16 at an intermediate point in the growing medium, i.e., spaced above inert sheet 10 but below compost layer 22. The net material greatly strengthens the sod product against tearing or rough handling during shipment or at the point of end use; the root system enjoys maximum intertwinement with the net strands at the connecting points between the roots and the grass stems. The net strands act as anchorages for the stems and the roots.

Pat. No. 3,863,388 to Loads shows a net structure 2 inter-engaged with the grass root system. However, the inter-engagement points are substantially below the basal node areas where the roots connect to the stems, and the spaces defined by the net structure are too small for adequate or proper extension and intertwining of the roots. The net mechanism used in the Loads patent is therefore not deemed to provide the anchoring action effected by my net structure and its positioning, wherein the openings defined by the net structure provide adequate space for extensions of roots therethrough and proper intertwining, and the level of the net structure in the product substantially facilitates engagement with the roots in the basal node area where the roots connect to the stems.

Using my method, large numbers of roots are formed in a relatively short period of time. Because there are large numbers of roots, each root does not have to grow to a relatively long length. Under conventional practice sod harvesting is delayed until the roots are on the order of twelve inches long (because there are only a relatively small number of roots to perform the mechanical support function and growth function). With my method the sod reaches a mature harvestable state when the roots are still relatively short (e.g., on the order of three inches long); the large numbers of short roots adequately perform the functions of smaller numbers of longer roots. An advantage of my method is a much shorter growing period, on or about 60 days.

It was earlier noted that mushroom mulch is a pasteurized material. The pasteurizing process destroys any weeds that might otherwise be in the material. Thus mushroom mulch is well-suited for sod-growing purposes.

I have shown in the drawings specific forms and size relationships that can be employed in practice of my invention. It will be appreciated however that the invention need not be practiced in exactly the manner described. Some variations may be utilized, as come within the attached claims.

The inventor claims:

1. A method of growing sod comprising the steps of:
   (a) laying a first relatively thick layer of compost mulch on an inert impervious subsurface to a depth of at least 2 inches.
   (b) placing a porous net of large mesh size on the upper surface of the compost layer having openings of at least 0.7 square inch,
   (c) sowing grass seed in the net openings, and
   (d) overlaying a second relatively thin layer of compost mulch on the seeded net surface to a depth of at least 1 inch.

2. The method of claim 1, wherein: the laying of the first and second compost layers comprises the positioning of mushroom mulch.

3. The method of claim 1, wherein: the laying of the first and second compost layers comprises the positioning of a growing medium of fermented partially decomposed wheat straw, horse manure, and water.

4. The method of claim 3, and further including: adding nitrogen to the manure to form microbial proteins.

5. The method of claim 3, wherein:
   the compost is provided with a water content of approximately fifty per cent on a weight basis.

6. The method of claim 1, wherein: the laying of the first and second compost layers comprises the positioning of a first compost layer having a thickness in the range of $2\frac{1}{2}$ to 3 inches.

7. The method of claim 1, wherein: the laying of the first and second compost layers comprises the positioning of a second compost layer having a thickness in the range from 1 to $1\frac{1}{2}$ inches.

8. The method of claim 1, and further including: providing such openings which are approximately $1\frac{1}{4}$ inch long and $\frac{3}{8}$ inch wide.

9. A method according to claim 1, wherein:
   the thickness of the compost mulch layer on the inert subsurface is in the range of $2\frac{1}{2}$ to 3 inches.

10. A method according to claim 1, wherein:
    said second thin layer of compost mulch is laid to a depth in the range of about 1 to $1\frac{1}{2}$ inches.

11. A sod product, comprising:
    a first relatively thick lower layer of compost having a depth of at least 2 inches,
    a porous large mesh size net atop the first compost layer, said porous net defining large openings sized to accommodate extension of grass roots therethrough in intertwining relationship to provide anchoring, said porous net having at least some openings areas of at least 0.7 square inch,
    a relatively thin upper layer of compost above the porous net having a depth of at least 1 inch, and
    grass plants having basal node areas thereof located at about the porous net plane to form anchorages for the roots that extend into the lower layer of compost.

12. A sod product according to claim 11, and further including:
an inert impervious sub-surface sheet under said lower compost layer.

13. A sod product according to claim 11, wherein: the compost is a mushroom mulch.

14. A sod product according to claim 10, wherein: the compost is a growing medium comprising fermented partially decomposed wheat straw, horse manure and water in a combined state.

15. A sod product according to claim 10, wherein: said openings in the porous net are generally rectangular and are about 1¼ inch long and ⅝ inch wide.

16. A sod product according to claim 10, wherein: the first compost layer has a thickness in the range of about 2½ to 3 inches, and
the second compost layer has a thickness in the range of about 1 to 1½ inches.

* * * * *